3,346,423
SOLID ELECTROLYTE BATTERY CELLS
Donald M. Smyth and Kurt Lehovec, Williamstown, Mass., assignors to Sprague Electric Company, North Adams, Mass., a corporation of Massachusetts
Continuation of application Ser. No. 84,483, Jan. 19, 1961. This application May 24, 1965, Ser. No. 462,470
1 Claim. (Cl. 136—153)

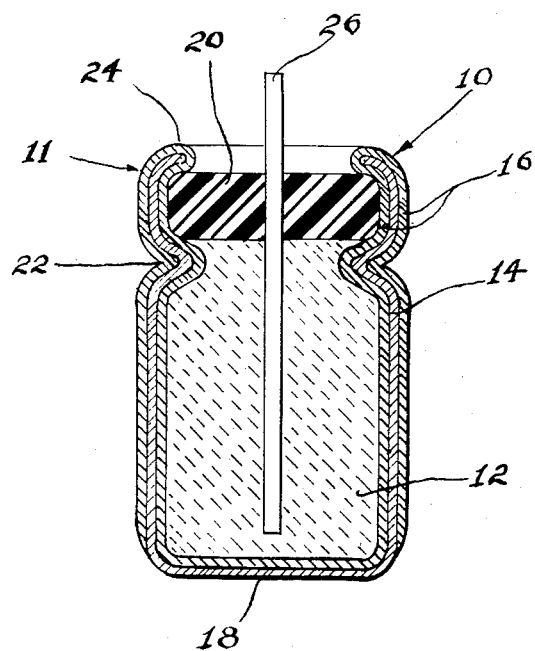

This application is a continuation of our application S.N. 84,483 filed Jan. 19, 1961, now abandoned, which in turn is a continuation-in-part of our application S.N. 693,940 filed Nov. 1, 1957, and later abandoned.

This invention relates to a solid electrolyte battery cell of the system comprising silver anode/silver halide electrolyte/halogen source cathode material, and more particularly relates to means for modifying the cathode material to enhance the operating characteristics of the cell.

The ideal barrier electrolyte for cells of the silver/silver/halide/halogen source system is an electrolyte having high ionic conductivity and no electronic conductivity. Since this ideal is not achieved in practice, the goal is to provide a cell with an electrolyte having an ionic conductivity that is higher by a factor of 100 or more than the electronic conductivity. If the electronic conductivity of the electrolyte becomes comparable to the ionic conductivity, the cell becomes internally loaded and part of the E.M.F. is short-circuited. In this situation the electronic current through the electrolyte has the same effect as an external current drain.

The available halogen in these cathode material has been provided, for example, by the use of solid iodine or by a material which dissociates to provide a lighter halogen, for example, chlorine, at a relatively low vapor pressure. An example of a dissociating material of this sort is a polyhalide ion-containing salt such as potassium tetrachloroiodide. These halogen vapor sources are made into practical cathode materials by mixing with a suitable conductive substance, such as a finely ground carbon black, and with or without a binder.

Solid electrolyte battery cells utilizing these dry cathode materials have exhibited various undesirable operating characteristics. Those using chlorine in the cathode material have been subject to severe losses of voltage at low temperatures, and shelf life of a cell including iodine in the cathode material has been prohibitively short.

An object of this invention is to provide a means for modifying the cathode material in a solid electrolyte battery cell to enhance the operating characteristics of the cell.

It is another object of this invention to provide a cell with means to maintain the ionic conductivity of the electrolyte greater than the electronic conductivity by a factor of 100 or more.

It is another object of this invention to provide a cell with an additive to the cathode mix that suppresses the electronic conduction of the cell.

It has been surprisingly discovered that the intentional exclusion of water or water vapor from these cathode materials has prevented solid electrolyte cells from being exploited to their fullest capabilities. With a cathode material including chlorine, a cell with a controlled moisture content has a higher E.M.F. and a lower impedance than a cell including no substantial amount of moisture. A chlorine cell including moisture also exhibits a lesser degree of voltage loss at low temperatures.

Furthermore, a disadvantage of a cell including dry iodine cathode material has been the extremely high tarnishing rate of the silver anode material which severely reduces the shelf life of the cell. When water or water vapor has been added to the iodine cathode material, tarnishing rates have been surprisingly suppressed by factors of 100 and larger, and the electrical operating characteristics are also surprisingly imporved. The maximum rate of current delivery is increased and the low temperature electrical properties are improved. This is highly significant because a silver iodide electrolyte layer has the highest ionic conductivity of all the silver halides and is, therefore, a most satisfactory form of cell for relatively high current solid electrolyte battery cells.

Novel features and advantages of the present invention will become apparent to one skilled in the art from a reading of the following description in conjunction with the accompanying drawing in which the single figure is a cross-sectional view in elevation of one embodiment of this invention.

The drawing shows a solid electrolyte battery cell 10 made in a cup-shaped form 11 to facilitate the ensealing of the cathode material 12 (later described in detail) and to minimize potential surface leakage between and from cathode material 12 and anode 14 of silver. A silver chloride solid barrier electrolyte layer 16 completely coats the inner surface of anode element 14, and covers the outer surface with the exception of a bare spot 18 of limited extent upon the base or bottom of anode 14. Spot 18 is left bare to permit conection of a conductive lead (not shown) to anode 14 for connecting cell 10 to other cells or an electrical circuit.

A plug 20 is inserted and sealed within the entrance to cup-shaped structure 11 by rolling the lip 24 over the plug and crimping the cup wall at 22. Plug 20 is advantageously made, for example, of a tetrafluoroethylene polymer or a thermoplastic polymer of trifluorochloroethylene. These materials effectively enseal the cathode material when assembled with a reasonably firm press fit within the entrance to cup-shaped element 11 in the manner shown, and they effectively resist corrosive vapors emitted from a halogen cathode material such as chlorine or iodine. Another effective end-seal may be produced without the use of crimps in cup 11 by inserting a cylindrical plug having a diameter slightly greater than a straight walled cup into the cup while the plug is under compression. Upon release of the compressive force, it has been found an intimate seal is effected with side walls of the cup and with the cathode lead.

A conductive terminal lead 26 is inserted with a reasonably firm press fit through plug 20 and extends in electrical contact within cathode material 12. Lead 26 which is of tantalum or the like when used with the controlled moisture content of this invention, effectively resists corrosion by the moist halogen-containing cathode material.

A preferred embodiment of this invention utilizes a cathode material 12 which contains a controlled amount of water. Only that amount of water is involved which can be absorbed by the constituents of the cathode mix. This preferred embodiment doesn't involve a liquid water phase, in that only bound water is present. The preferred cathode mixture to which this controlled amount of water is added is the cathode mix of U.S. 2,905,740 comprising potassium tetrachloroiodide ($KICl_4$) as the halogen source, carbon black as the electronic conducting material, and polychlorotrifluoroethylene grease (Kel-F #90) as the binder.

The controlled amount of water that is absorbed by the cathode mix of this embodiment is believed to function to form an adsorbed layer on the cathode side of the silver halide barrier electrolyte film.

This adsorbed layer serves to block the flow of electronic current into the electrolyte. This restraint on electronic conduction prevents the electronic current from loading down the cell and causing a drop in terminal voltage, which in the past became increasingly severe with decreasing temperature.

A specific example which should be understood to be merely illustrative of this preferred embodiment is as follows with all quantities being parts by weight: six parts $KICl_4$ and one part carbon black are mixed in a glass ball mill; water in the amount of 0.35 part is then mixed in by agitation and stirring; the resulting mixture is allowed to stand for roughly a full day to ensure a homogeneous distribution of the water; the humidified powder is then mixed with four parts Kel-F #90 grease. This product is utilized in a cell of the type shown in the drawing by being extruded into the anode cup. Inasmuch as the carbon black is the absorptive constituent of the mix, the range of useful water addition is defined with respect to the carbon as being 0.1 to 1 part by weight or 10% to 100% by weight of the carbon.

An alternative method of producing the cathode mix of this preferred embodiment is to expose the mixture of $KICl_4$ and carbon black to water vapor over a saturated solution of suitable water vapor pressure, e.g. a saturated solution of sodium chloride, in an evacuated container at room temperature overnight.

Another effective composition for cathode material 12 incorporates an aqueous solution of an active halogen source as the cathode material, for example, an aqueous solution of one of the salts containing the tetrachloroiodide anion such as potassium tetrachloroiodide. This type of salt, which may be referred to as polyhalide salt, tends to gradually decompose to a simple halide or a simpler polyhalide plus a halogen or interhalogen. Chlorine is therefore gradually liberated by the dissociation of this salt at a very low vapor pressure to provide a fairly long-lasting source of a lighter halogen. It is advantageous to add enough hydrochloric acid to make the solution at least $\frac{1}{20}$ N of HCl to suppress complicating hydrolysis reactions. It is necessary to utilize an inert material such as platinum for terminal lead 26 with this aqueous embodiment of cathode material 12.

Relatively fine conductive particles of graphite or carbon black are suspended in the cathode material to make it electronically conductive. Additives such as ethylene glycol or methyl alcohol may be incorporated in the cathode material to reduce the freezing point of the water. Ranges of proportions of illustrative compositions and specific examples of particularly effective compositions are set forth in the following:

| Constituent | Range (parts by weight) | Example |
|---|---|---|
| Active Cathode Material | 5-10 | 5 |
| Carbon Black | 1-2 | 1 |
| 1/20 N HCl Solution | 2-20 | 5 |

| Constituent | Range (parts by weight) | Example |
|---|---|---|
| Active Cathode Material | 5-10 | 5 |
| Carbon Black | 1-2 | 1 |
| 1/20 N HCl Solution | 1-10 | 3 |
| Additives | 5-10 | 2 |

A cell prepared in this way has provided far higher E.M.F.'s and lower internal impedances than cells including a source of dry chlorine. Dry Chlorine cells, for example, provided E.M.F.'s and internal impedances respectively in the ranges of 0.5 to 0.7 volt and $10^6$ to $10^8$ ohms. The cells prepared in accordance with this invention maintain their E.M.F.'s even down to relatively low temperatures. For example, at $-50°$ C., the E.M.F. is maintained in the range of 1.00 to 1.02 volts, whereas solid electrolyte battery cells incorporating a source of dry chlorine have their voltages depressed to a range of 0.2 to 0.3 volts at $-20°$ C.

Another form of advantageous active cathode material is crystalline iodine. It has been surprisingly found that the tarnishing or reacting rate of a silver anode with an iodine cathode to form a silver iodide solid electrolyte layer therebetween is suppressed by at least a factor of 100 by the presence of a controlled amount of water or water vapor in the iodine. This discovery makes it possible to increase the shelf life of an $Ag/AgI/I_2$ cell to practical magnitudes of several years from prohibitively short shelf lives in the range of only several days.

The water vapor may be provided according to one embodiment of this invention by incorporating a hydrated salt of appropriate water vapor pressure in the cathode material in addition to the usual crystalline iodine, carbon black, and a binder such as Kel-F #90 grease. Examples of such hydrated salts are $MgCl_2 \cdot 6H_2O$; $MgSO_4 \cdot 7H_2O$; $Na_2CO_3 \cdot 10H_2O$; $Na_2SO_4 \cdot 10H_2O$; $Na_2HPO_4 \cdot 12H_2O$; $CaCl_2 \cdot 6H_2O$; $CaCl_2 \cdot 2H_2O$; etc. These salts may be mixed in the following ranges and proportions with the other materials to provide highly effective battery cells.

| Constituent | Range (parts by weight) | Example |
|---|---|---|
| Active Cathode Material | 2-10 | 6 |
| Carbon Black | 1-2 | 1 |
| Binder | 1-6 | 3 |
| Hydrated Salt | 1-5 | 1 |

The presence of the water vapor increases the shelf life and improves low temperature electrical properties. Such cells provide currents in the relatively milliampere range. A typical cell of this sort, for example, has an E.M.F. of 0.69 volt and a short-circuit current of 1.5 milliamperes at $25°$ C. with a cell being of a size occupying a volume of the order of 0.005 cubic inch.

It is not completely understood why the presence of some amount of water or water vapor enhances the properties of solid electrolyte battery cells incorporating halogen-type active cathode materials, but it is suspected that in the halogen-silver cell, for example, the tarnishing rate is reduced because the water or water vapor provides a surface charge on the tarnished solid electrolyte layer which induces a space charge layer near the surface of this tarnished film. This space charge layer is of such a polarity that it blocks the flow of either electrons or holes through the electrolyte layer to thereby reduce the reaction rate between the cathode and anode material.

Other fluids, instead of or in addition to water, can suppress the tarnishing rate of the anode by the cathode materials and accordingly improve the electrical operating characteristics of a solid electrolyte battery cell. An example of an operative fluid quite different from water in its physical and chemical properties is carbon tetrachloride ($CCl_4$). When a small amount of $CCl_4$ in the same ranges as mentioned with respect to water has been added to the cathode material, a similar reduction in the tarnishing rate has been achieved. The fact that very polar water and non-polar carbon tetrachloride serve the same function indicates that the large number and variety of liquids whose properties range between water and carbon tetrachloride can also operate to suppress the tarnishing rate and improve the operating characteristic of solid electrolyte battery cells. Additional examples of liquids which are operative in this manner and which will not dissolve the silver halide electrolyte are as follows: methyl alcohol, ethyl alcohol, chloroform, and acetone. It is clear that both strongly polar and non-polar molecules give he desired effect.

It should be pointed out that these cells are definitely still solid electrolyte cells even in the presence of water, since the silver halides are insoluble in water. The water is of importance only in the cathode vapor and does not serve as an electrolyte phase as it does in conventional cells.

What is claimed is:

A battery cell including a silver electron donor anode and a halogen electron acceptor material separated by a layer of solid barrier electrolyte material incorporating a silver halide selected from the group consisting of silver iodide, silver bromide, and silver chloride; comprising the incorporation of a hydrated salt selected from the group consisting of $MgCl_2 \cdot 6H_2O$, $MgSO_4 \cdot 7H_2O$, $Na_2CO_3 \cdot 10H_2O$ $NaSO_4 \cdot 10H_2O$, $Na_2HPO_4 \cdot 12H_2O$, $CaCl_2 \cdot 2H_2O$, and $CaCl_2 \cdot 6H_2O$ in the cathode material in the range of from 1 to 5 parts by weight of salt to 2 to 10 parts by weight of active cathode material to maintain sufficient water vapor pressure in said cathode material to enhance its operating characteristics.

References Cited

UNITED STATES PATENTS 2,793,244  5/1957  Van Der Grinten __ 136—153 X

WINSTON A. DOUGLAS, *Primary Examiner.*

B. J. OHLENDORF, A. SKAPARS, *Assistant Examiners.*